United States Patent

[11] 3,625,259

| [72] | Inventor | Ted Kennedy, Jr.<br>Ann Arbor, Mich. |
| --- | --- | --- |
| [21] | Appl. No. | 866,612 |
| [22] | Filed | Oct. 15, 1969 |
| [45] | Patented | Dec. 7, 1971 |
| [73] | Assignee | The Trenton Corporation<br>Ann Arbor, Mich. |

[54] PRECOATED UNDERGROUND PIPING
4 Claims, 3 Drawing Figs.

[52] U.S. Cl. .................................................. 138/145,
138/142, 138/171, 138/144
[51] Int. Cl. .................................................. F16l 9/14
[50] Field of Search ........................................ 138/127,
134, 140, 144, 143, 171, 156, 178, 142, 75, 106

[56]  References Cited
UNITED STATES PATENTS

| 655,304 | 8/1900 | Midgley | 138/171 X |
| --- | --- | --- | --- |
| 1,441,484 | 1/1923 | Connover | 138/171 |
| 1,842,298 | 1/1932 | Smith | 138/145 X |
| 1,988,628 | 1/1935 | McDonald | 132/145 X |
| 2,713,383 | 7/1955 | Kennedy | 138/145 X |
| 3,040,781 | 6/1962 | Reymann | 138/171 X |

Primary Examiner—Herbert F. Ross
Attorney—Whittemore, Hulbert & Belknap

ABSTRACT: A protective cover for an underground conduit having a raised weld. The cover consists of a relatively hard corrosion-resistant precoating applied over the weld, and an elongated protective strip wrapped around the conduit, with or without a primary coating under the strip.

PATENTED DEC 7 1971  3,625,259

INVENTOR.
TED KENNEDY JR.

BY
Whittemore, Hulbert & Belknap

ATTORNEYS 3,625,259

PRECOATED UNDERGROUND PIPING

SUMMARY OF THE INVENTION

One object of this invention is to provide an improved protective cover for welded conduits.

Another object is to provide a protective cover for raised welds on conduits including a precoating of corrosion-resistant material applied over the weld and preferably extending some distance either side of the weld.

Another object is to provide a protective cover including an elongated strip wrapped around the conduit and over the precoated weld, with or without a primary coating under the strip.

Other objects and features of the invention will become apparent as the description proceeds, especially when taken in conjunction with the accompanying drawing, wherein.

Figure 1:
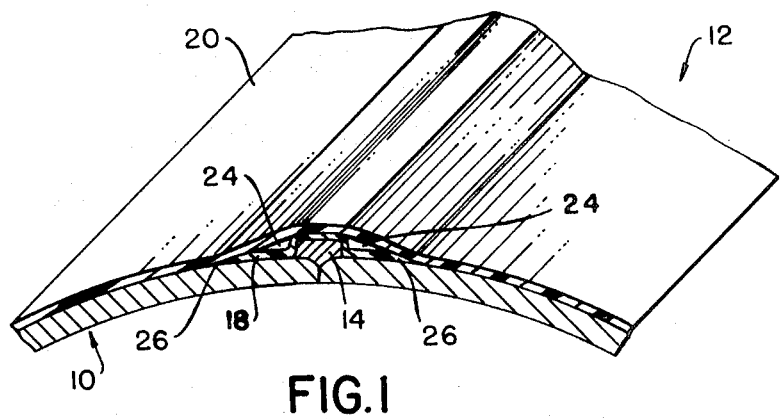
FIG. 1 is a fragmentary perspective view with parts broken away and in section illustrating a length of pipe having a protective cover in accordance with my invention.

Referring now more particularly to the drawing, the reference numeral 10 designates a length of pipe or conduit which has a corrosion-resistant protective cover 12 and which is adapted to be used in an underground installation.

The pipe or conduit 10 is a welded metal pipe having in the present instance both a raised longitudinal weld 14 and a raised circumferential or girth weld 16. Pipes of this description are subject to corrosion due to the presence of ground moisture and other corrosion-inducing agents in the soil, and the purpose of the corrosion-resistant cover 12 is to prevent such agents from coming into contact with the pipe, and thereby prolong the life of the pipe. It should be noted that a welded pipe is particularly vulnerable to corrosion at the welds because of the presence of dissimilar metals.

Figure 2:
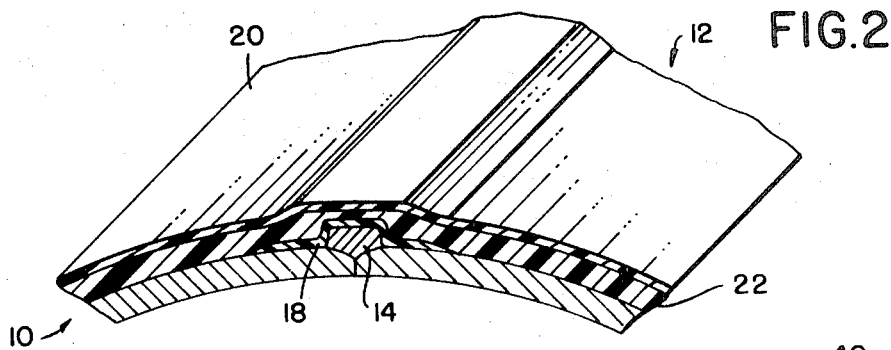
FIG. 2 is a sectional view similar to FIG. 1 but showing a modification.

The protective cover in this instance includes a precoating 18 applied over the longitudinal and girth welds 14 and 16 and an elongated protective strip 20 wrapped around the pipe and over the precoating material, with or without a primary coating 22 under the strip 20. FIG. 1 illustrates the cover 12 without the primary coating 22, and FIG. 2 illustrates the cover 12 as including the primary coating 22.

The precoating 18 is applied to the welds and to limited areas of the outer surface of the pipe on both sides of the welds so as to provide added protection where it is most needed. The precoating material 18 is hard, is corrosion resistant and may for example be of the epoxy or vinyl types or any other hard finish, plastic, resin, tar, mastic or similar material. The precoating material will preferably be thermosetting so as not only to be relatively hard but to remain hard and be unaffected by subsequent mechanical cleaning action by instruments such as brushes and knives and by the heat of a hot-applied coating such as the coating 22. The mechanical cleaning action referred to ordinarily precedes the application of the coating 22 and the wrapper strip 20.

The elongated protective strip 20 may be formed for example of a dielectric plastic or resinous material which is corrosion-resistant. It may also be formed of a nondielectric material such as saturated glass mat, kraft paper, rag felt, asbestos felt or similar materials. When a plastic or resinous material is used, it preferably takes the form of a polyethylene or polyvinyl chloride film, although other plastic film materials may be used, such as polypropylene or polyvinylidene chloride. Such resins have high mechanical strength, good dielectric strength, excellent abrasion resistance, extremely low water-vapor transmission, are exceptionally flexible over wide ranges of temperatures, may be economically produced in films having a gage as thin as 0.001 inches, and resist chemicals, fungi, oils and water. Resin films such as those described may be made into tapes by applying to one side thereof pressure-sensitive adhesives, solvent-actuated mastics or like materials which are or become tacky.

When a primary coating 22 is used, it may be in the form of coal tar, asphalt or a petroleum-type wax having the required physical specifications to function adequately and resist the entrance of moisture, chemicals, fungi, oils and other elements which may induce corrosion. Such materials are well known in the trade and possess excellent corrosion-resistant qualities and also may be readily applied to a length of pipe. Such materials may be applied to a length of pipe at heat softening temperatures in the range of approximately 250° F. to 550° F. Some such materials may be applied cold.

Protective systems consisting of an outer protective strip wrapper 20 with or without a primary coating have been employed in the past. In some instances, the strip wrapper 20 has been formed of one or another of the dielectric corrosion-resistant materials referred to above and has been used without a primary coating. In these instances primary wrapper 20 bridges over welds 14 and 16 leaving voids 24 on either side of the weld. Corrosive agents can and do penetrate under protective wrapper strip 20 into these voids 24 and cause corrosion. Precoating of the welds prior to cleaning of pipe and application of protective wrapper strip 20 will prevent this corrosion.

In other instances, the strip wrapper applied over the primary coating has been nondielectric because the primary coating itself is corrosion-resistant. Under these circumstances, it has been found that where a weld exists the primary coating becomes thinned over the welds when the outer wrapper strip is applied. Thus when nondielectric strips have been wrapped over a primary coating, the weld has been a particularly vulnerable point where corrosion is more likely to attach the pipe because it has the least thickness of primary coating protecting against the entrance of corrosion-inducing elements. Thus the precoating 18 of this invention will give added protection against corrosion where the primary coating 22 is the thinnest.

Referring to FIG. 1, the strip 20 is preferably wound helically around the pipe in overlapping convolutions. Since in FIG. 1 the primary coating 22 is omitted, the strip becomes the primary protection against corrosion and therefore the strip should be a dielectric corrosion-resistant film formed of a material such as one of those referred to hereinabove.

There are voids 24 under the strip 20 on opposite sides of the welds. As stated above, these voids are points where moisture or other corrosion-inducing elements will be most likely to collect when such elements inevitably leak into the voids. The voids obviously in most instances will extend continuously throughout the length of the weld. Accordingly, the precoating material 18 as seen in FIG. 1 not only covers the weld but also is extended on both sides of the weld to protect the pipe surface areas which would otherwise be exposed in the voids 24. The precoating 18 does not have to extend beyond the voids because the remaining surface area of the pipe is protected and contacted by the film 20 itself.

With further reference to FIG. 1, it will be understood that a suitable primer may be applied over the pipe and over the precoating 18 before the film 20 is applied. Also, the film 20 employed in FIG. 1 may be made into a tape by adding a tacky material to one side such as a pressure-sensitive adhesive or a solvent-actuated mastic, for example. The added tacky material causes the film to cling more firmly to the pipe or to the primer-coated surface of the pipe if a primer is employed. The primer selected should be compatible with the tacky material on the inner side of the film 20.

The modification shown in FIG. 2 provides a cover 12 which is substantially like that shown in FIG. 1 but with the addition of the primary coating 22 under the strip 20. Since the primary coating material is itself corrosion-resistant, the strip 20 may be either dielectric or nondielectric and may for example be selected from one of the materials suggested hereinabove.

Figure 3:
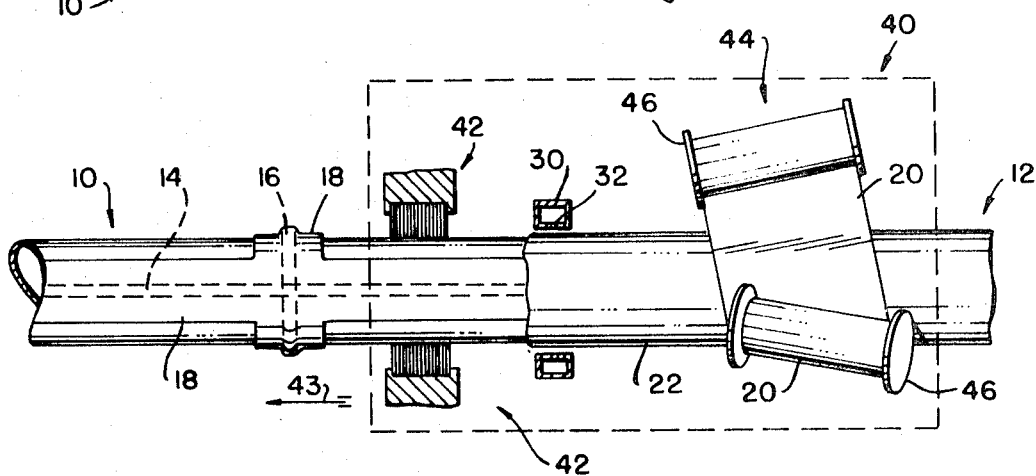
FIG. 3 is a fragmentary elevational view with parts broken away and in section diagrammatically illustrating the application of the protective covering to a length of pipe.

The primary coating material covers the entirety of the outer surface of the pipe including the precoated welds. As shown in FIG. 2, the primary coating 20 is thinned somewhat over the top of the weld formation. Thus the precoating 18 provides additional protection in the weld areas. FIG. 3 diagrammatically illustrates the precoated pipe 10 being brushed, coated and wrapped to provide the covered pipe shown in FIG. 2. By merely deactivating the coating ring 30 used to apply the primary coating 22, the apparatus of FIG. 3 may be employed to apply the FIG. 1 type cover to the pipe. On the other hand, if the FIG. 1 pipe cover is to include a primer, the primer may be applied with rags or similar spreading devices associated with the coating ring and spread over all surface areas of the pipe.

As viewed in FIG. 3, the pipe 10 has the primary coating material 18 applied over its longitudinal and girth welds 14 and 16 before it enters the equipment 40 for subsequent brushing coating and wrapping. The equipment or machine 40 includes brushes 42 for brushing and cleaning the outer surface of the pipe. The apparatus 40 moves in the direction of the arrow 43 with respect to the pipe. The precoating material 18 is of course hardened and set and is sufficiently tough to withstand the brushing action without being damaged.

The machine 40 also includes the spray ring 30 which is to the rear of the brushes 42 having the radially inner spray orifices 32 through which the coating material 22 may be applied. As indicated, if the primary coating 22 is to be omitted to provide the FIG. 1 cover, then the spray ring 30 will not be activated.

The machine 40 also includes a strip-winding apparatus 44 which is to the rear of the spray ring 30. The strip-winding apparatus includes the rolls 46 having lengths of the strip 20 thereon. The rolls 46 are orbited around the pipe and as the apparatus 40 moves in the direction of arrow 43 the strips are wound helically around the pipe in overlapping folds.

I claim:

1. In combination with a length of underground metal pipe having a weld seam, a protective cover or said pipe comprising a narrow area of a thermosetting corrosion-resistant coating, said coating covering the weld seam and a narrow portion only adjacent each side of said seam, and an adhesive coated corrosion-resistant plastic strip helically wrapped around the entire pipe for the length thereof, the adhesive side of said plastic strip contacting the surface of said pipe.

2. The combination set forth in claim 1, wherein said coating is relatively hard.

3. The combination set forth in claim 1, wherein said plastic strip comprises an elongated dielectric plastic resinous strip of corrosion-resistant material.

4. The combination set forth in claim 1, wherein a primer compatible with the adhesive is applied over the pipe and coating and under the plastic strip.

* * * * *